(12) United States Patent
Davydov et al.

(10) Patent No.: US 10,103,797 B2
(45) Date of Patent: Oct. 16, 2018

(54) QUASI CO-LOCATION AND PDSCH RESOURCE ELEMENT MAPPING SIGNALING FOR NETWORK ASSISTED INTERFERENCE MITIGATION

(71) Applicant: Intel IP Corporation, Santa Clara, CA (US)

(72) Inventors: Alexei Davydov, Nizhny Novgorod (RU); Seunghee Han, Cupertino, CA (US); Gregory Morozov, Nizhny Novgorod (RU); Yuan Zhu, Beijing (CN); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 274 days.

(21) Appl. No.: 14/764,540

(22) PCT Filed: Dec. 16, 2013

(86) PCT No.: PCT/US2013/075455
§ 371 (c)(1),
(2) Date: Jul. 29, 2015

(87) PCT Pub. No.: WO2014/133650
PCT Pub. Date: Sep. 4, 2014

(65) Prior Publication Data
US 2015/0365154 A1    Dec. 17, 2015

Related U.S. Application Data

(60) Provisional application No. 61/771,698, filed on Mar. 1, 2013, provisional application No. 61/898,425, filed on Oct. 31, 2013.

(51) Int. Cl.
H04B 7/06 (2006.01)
H04B 7/024 (2017.01)
(Continued)

(52) U.S. Cl.
CPC .......... *H04B 7/0626* (2013.01); *H04B 7/024* (2013.01); *H04B 7/0417* (2013.01);
(Continued)

(58) Field of Classification Search
CPC .................................................. H04B 7/0626
See application file for complete search history.

(56) References Cited

U.S. PATENT DOCUMENTS 9,497,180 B2 * 11/2016 Oyman .................. H04L 63/10
9,621,316 B2 *  4/2017 Kim ...................... H04L 5/0048
(Continued)

FOREIGN PATENT DOCUMENTS

CN     102754458 A    10/2012
WO   WO 2010/098634 A2   9/2010
(Continued)

OTHER PUBLICATIONS

International Search Report and Written Opinion dated Mar. 26, 2014 from International Application No. PCT/US2013/075455.
(Continued)

*Primary Examiner* — Raj Jain
*Assistant Examiner* — Andrew C Lee
(74) *Attorney, Agent, or Firm* — Schwabe, Williamson & Wyatt, P.C.

(57) ABSTRACT

Embodiments of the present disclosure describe systems and methods for mitigating interference in wireless networks. Various embodiments may include signaling of quasi co-location and resource element mapping of an interfering physical downlink shared channel. Other embodiments may be described and/or claimed.

16 Claims, 9 Drawing Sheets

(51) Int. Cl.
*H04B 7/0417* (2017.01)
*H04B 17/345* (2015.01)
*H04W 72/04* (2009.01)
*H04W 72/08* (2009.01)

(52) U.S. Cl.
CPC ......... *H04B 7/0632* (2013.01); *H04B 17/345* (2015.01); *H04W 72/042* (2013.01); *H04W 72/082* (2013.01)

(56) References Cited

U.S. PATENT DOCUMENTS

| | | | | |
|---|---|---|---|---|
| 9,643,126 | B2* | 5/2017 | Sotemann | B01D 57/02 |
| 9,768,898 | B2* | 9/2017 | Hwang | H04J 11/0053 |
| 2012/0046033 | A1 | 2/2012 | Ko et al. | |
| 2013/0301434 | A1* | 11/2013 | Krishnamurthy | H04L 1/0026 370/252 |
| 2013/0301542 | A1* | 11/2013 | Krishnamurthy | H04W 52/50 370/329 |
| 2014/0022988 | A1* | 1/2014 | Davydov | H04B 7/024 370/328 |
| 2015/0016369 | A1* | 1/2015 | Park | H04B 7/024 370/329 |
| 2015/0023265 | A1* | 1/2015 | Park | H04B 7/024 370/329 |
| 2015/0029966 | A1* | 1/2015 | Park | H04L 5/0014 370/329 |
| 2015/0029972 | A1* | 1/2015 | Park | H04L 1/1812 370/329 |
| 2015/0146644 | A1* | 5/2015 | Kim | H04L 5/0048 370/329 |
| 2015/0180625 | A1* | 6/2015 | Park | H04W 72/04 370/329 |
| 2015/0195068 | A1* | 7/2015 | Kim | H04L 5/0048 370/329 |
| 2015/0207601 | A1* | 7/2015 | Kim | H04L 5/0048 370/329 |
| 2015/0223208 | A1* | 8/2015 | Park | H04L 5/001 370/329 |
| 2015/0341132 | A1* | 11/2015 | Hwang | H04L 5/0048 370/329 |
| 2016/0013903 | A1* | 1/2016 | Kim | H04J 11/005 370/329 |
| 2016/0021565 | A1* | 1/2016 | Kim | H04L 5/005 370/329 |
| 2016/0119936 | A1* | 4/2016 | Kim | H04J 11/0053 370/329 |
| 2016/0204921 | A1* | 7/2016 | Kim | H04L 12/189 370/312 |
| 2016/0226538 | A1* | 8/2016 | Kim | H04B 1/123 |

FOREIGN PATENT DOCUMENTS

| | | |
|---|---|---|
| WO | WO 2013/002563 A2 | 1/2013 |
| WO | WO 2013/018990 A1 | 2/2013 |

OTHER PUBLICATIONS

ETRI, "PDSCH RE mapping and quasi-collocation signaling for CoMP," 3GPP TSG RAN WG1 Meeting #70bis, R1-124333, Oct. 8-12, 2012, San Diego, USA, 3 pages.
3GPP, "Evolved Universal Terrestrial Radio Access (E-UTRA); Physical Channels and Modulation (Release 11)," 3GPP TS 36.211 V11.1.0 (Dec. 2012), Dec. 20, 2012, LTE Advanced, 108 pages.
3GPP, "Evolved Universal Terrestrial Radio Access (E-UTRA); Physical layer procedures (Release 11)," 3GPP TS 36.213 V11.1.0 (Dec. 2012), Dec. 20, 2012, LTE Advanced, 160 pages.
International Preliminary Report on Patentability dated Sep. 11, 2015 from International Application No. PCT/US2013/075455.

* cited by examiner

QUASI CO-LOCATION AND PDSCH RESOURCE ELEMENT MAPPING SIGNALING FOR NETWORK ASSISTED INTERFERENCE MITIGATION

CROSS REFERENCE TO RELATED APPLICATIONS

The present application is a national phase entry under 35 U.S.C. § 371 of International Application No. PCT/US2013/075455, filed 16 Dec. 2013, entitled "QUASI CO-LOCATION AND PDSCH RESOURCE ELEMENT MAPPING SIGNALING FOR NETWORK ASSISTED INTERFERENCE MITIGATION," which designates the United States of America, and claims priority to U.S. Provisional Application No. 61/771,698, filed 1 Mar. 2013, entitled "ADVANCED WIRELESS COMMUNICATION SYSTEMS AND TECHNIQUES," and to U.S. Provisional Application No. 61/898,425, filed 31 Oct. 2013, entitled "ADVANCED WIRELESS COMMUNICATION SYSTEMS AND TECHNIQUES." The entire disclosures of which are hereby incorporated by reference in their entireties.

FIELD

Embodiments of the present disclosure generally relate to the field of wireless communication, and more particularly, to interference mitigation.

BACKGROUND

Downlink coordinated multi-point (DL CoMP) was introduced in Release 11 of the $3^{rd}$ Generation Partnership Project (3GPP) Long Term Evolution (LTE) standard to address the issue of throughput performance for cell-edge users. While DL CoMP may increase throughput performance for cell-edge users, these users may still face interference from the neighboring cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

Embodiments of the present disclosure describe provision of resource element (RE) mapping and quasi co-location (QCL) information related to an interfering signal to a user equipment. The UE may use this information to estimate a channel on which the interfering signal is transmitted. This estimation may then be used by the receiver for interference mitigation.

Figure 1:
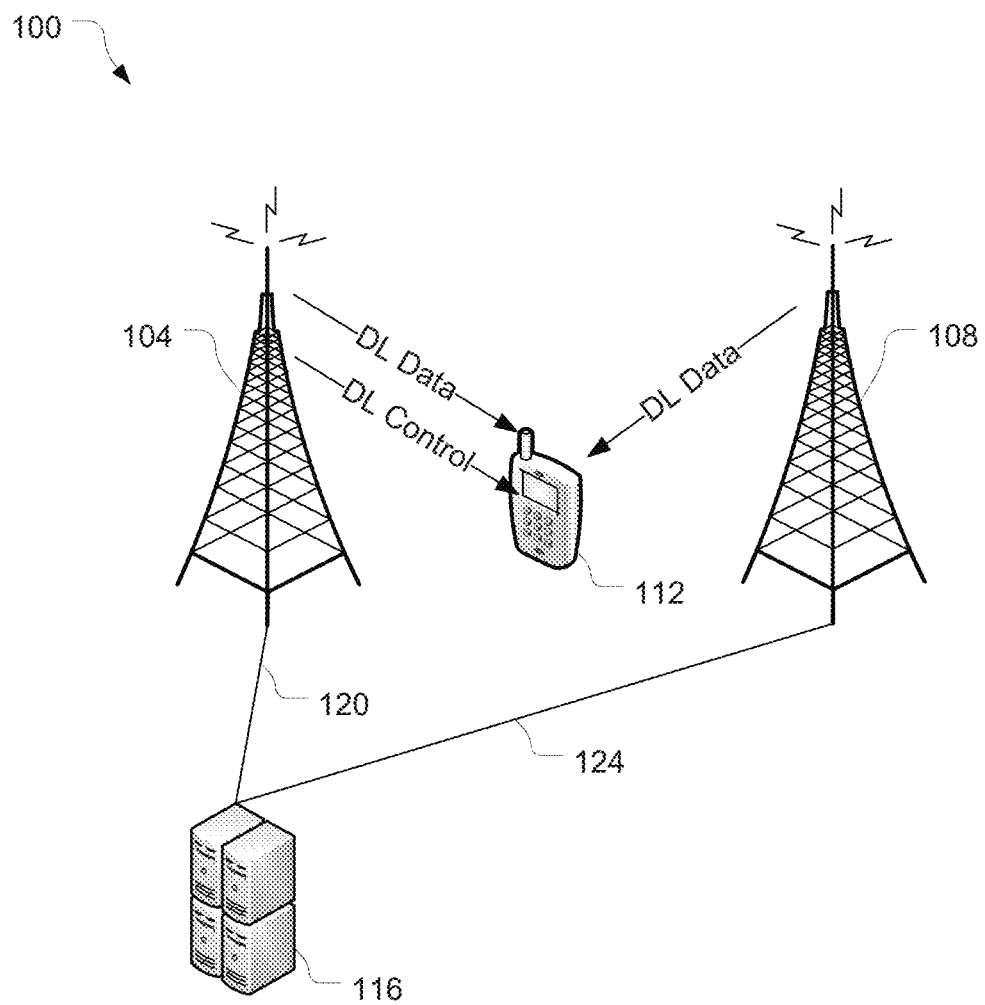
FIG. 1 illustrates an example wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network (or an LTE-Advanced (LTE-A) network) such as an evolved universal terrestrial radio access network (E-UTRAN). The network 100 may include access nodes, for example, enhanced node base station (eNB) 104 and eNB 108, configured to wirelessly communicate with user equipment (UE), such as UE 112. The eNBs 104 and 108 may be connected with core network equipment 116 through respective backhaul links 120 and 124. While the present embodiment describes the access nodes as eNBs, other embodiments may include other types of access nodes such as, but not limited to, remote radio heads (RRHs), base stations, or other transmission points.

The eNBs 104 and 108 may provide radio coverage for respective cells. The cell size may be based on, for example, transmission power capabilities of the eNBs 104 and 108. The eNBs 104 and 108 may each have generally the same transmission power capabilities as one another or, alternatively, one of the eNBs may have relatively lower transmission power capabilities. For example, in one embodiment the eNB 104 may be a relatively high-power access node such as a macro eNB, while the eNB 108 may be relatively low-power access node, for example, a pico eNB and/or a femto eNB.

In some embodiments, users on an edge of a cell may experience decreased performance due to, for example, decreased power of the eNB of the serving cell and/or increased interference of the neighboring cells. Downlink coordinate multipoint (DL CoMP) may be used to increase throughput performance for users on an edge of a cell. The throughput improvement in DL CoMP may be achieved by coordination of the eNBs of the neighboring cells by, for example, dynamic point selection (DPS).

In DPS CoMP, the transmission point can be dynamically selected as eNB 104 or eNB 108 based on instantaneous channel/interference conditions and cell load. As a physical downlink shared channel (PDSCH) transmission in DL CoMP may not be co-located with the serving cell, quasi co-location signaling may be used to indicate a set of reference signals/antenna ports that experience the same propagation, for example, belong to the same transmission point.

Two antenna ports may be said to be quasi co-located if large-scale properties of a radio channel (hereinafter "channel") over which a symbol on one antenna port is conveyed can be inferred from a channel over which a symbol on the other antenna port is conveyed. The large-scale properties may include, for example, delay spread, Doppler spread, Doppler shift, average gain, and average delay.

In some embodiments, a relationship between reference signals and antenna ports may be defined as follows. Common reference signals (CRSs), which may be used by UEs for both channel estimation for demodulation of data and to derive feedback on the quality and spatial properties of the channel, may be transmitted using antenna ports 0, 1, 2, and 3. Channel state information-reference signals (CSI-RSs), which may be used by UEs to derive feedback on the quality and spatial properties of the channel, may be transmitted using antenna ports 15, 16, 17, 18, 19, 20, 21, and 22. PDSCH UE-specific reference signals (UE-RS), which may be embedded in the PDSCH and used for demodulation of data, may be transmitted using antenna ports 7, 8, 9, 10, 11, 12, 13, and 14. And enhanced physical downlink control channel (EPDCCH) UE-specific reference signals, which may be embedded in the EPDCCH and used for demodulation of data, may be transmitted using antenna ports 107, 108, 109, and 110.

In some embodiments, the network 100 may be a heterogeneous network (for example, having macro-, pico-, and/or femto-eNBs) to achieve cell-splitting gains and/or may use multiple user multiple input multiple output (MIMO) communications. In both scenarios, co-channel interference, either from inter-cell or co-scheduled, intra-cell users, may be a dominant limiting factor for achieving higher network capacity. To some extent, co-channel interference may be mitigated at the network side by, for example, using CoMP to avoid interference at the transmitting eNB. Interference mitigation may additionally/alternatively be employed at the UE side by accounting for spatial and signal properties of the interference, which may provide promising gains in spectral efficiency.

Embodiments described herein provide for further enhancements for interference mitigation at the UE side that may be achieved through advanced receiver algorithms. The receiver algorithms may be supported by providing the UE 112 with additional information about interference structure.

For example, as will be described in further detail, a receiver of a UE may be provided with side knowledge of the interference such as, but not limited to, the modulation format and reference symbols, quasi co-location information, PDSCH resource element (RE) mapping information, etc. With such information, the receiver may improve performance of various physical channels such as PDSCH, PDCCH, EPDCCH, etc.

In some embodiments, the UE 112 may be provided with information to facilitate measurement of channels on which interfering signals are received in addition to measuring channels on which the useful signal is received. This may, for example, facilitate the use of advanced receivers such as maximum likelihood detection (MLD) receivers, successive interference cancellation (SIC) receivers, etc., used in network-assisted interference cancellation and suppression (NAICS) systems.

Various transmission modes have been defined in LTE to allow for the ability to adjust the type of multi-antenna technique to use according to, for example, a particular radio environment. The different transmission modes vary in number of layers, antenna ports used, type of reference signal, and precoding type. If, in an NAICS system, the UE 112 is configured in transmission mode 10 (TM10), the channels from a serving eNB, e.g., eNB 104, and an interfering eNB, e.g., eNB 108, can be estimated using UE-specific reference signals. Since for practical applications synchronization between the eNBs 104 and 108 is not perfect, the antenna ports over which the UE-specific reference signals are transmitted typically cannot be assumed as quasi co-located with respect to frequency and timing offsets. Furthermore, due to different propagation characteristics, the antenna ports of the different eNBs used for transmitting UE-specific reference signals cannot be assumed as quasi co-located with respect to delay spread, Doppler spread and average gain.

When a resource allocation is small, for example, 1 or 2 physical resource blocks (PRBs), an estimation of time/frequency offset of an interfering signal using UE-specific RS may be inaccurate. Furthermore, due to potentially different configuration of CRS, multicast-broadcast single-frequency network (MBSFN) subframes, and PDSCH starting symbol across different cells, the interfering PDSCH RE mapping may be different than a serving PDSCH RE mapping. Thus, embodiments provide signaling to the UE 112 to indicate interfering PDSCH RE mapping within a subframe.

Figure 2:
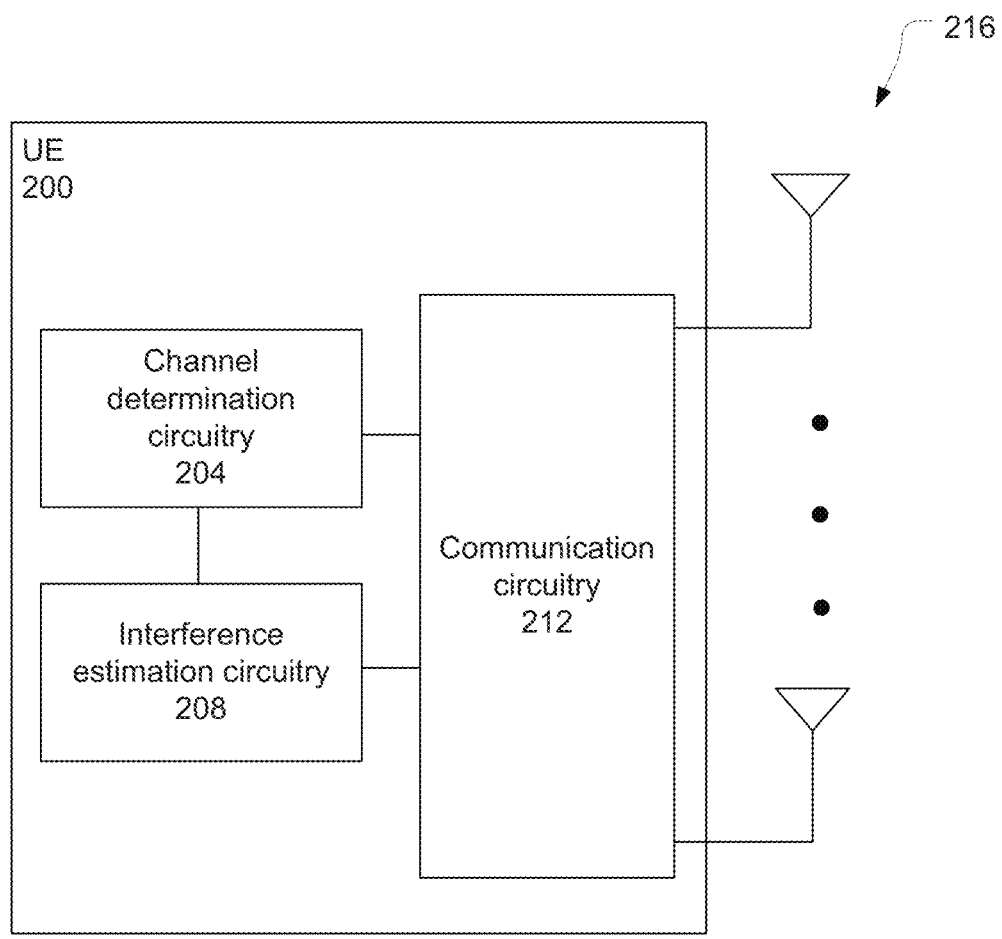
FIG. 2 is a block diagram of an illustrative user equipment (UE) in accordance with various embodiments.

FIG. 2 illustrates a UE 200 in accordance with some embodiments. The UE 200 may be similar to, and substantially interchangeable with, UE 112 of FIG. 1. The UE 200 may include channel determination circuitry 204, interference estimation circuitry 208, communication circuitry 212, and one or more antennas 216 coupled with each other at least as shown.

Briefly, the communication circuitry 212 may be coupled with the antennas to facilitate over-the-air communication of signals to/from the UE 200. Operations of the communication circuitry 212 may include, but is not limited to, filtering, amplifying, storing, modulating, demodulating, transforming, etc.

The channel determination circuitry 204 may be coupled with the communication circuitry 212 and may be configured to determine downlink parameters of a serving and/or an interfering cell. In some embodiments, the channel determination circuitry 204 may receive signals via the communication circuitry 212 and may determine the downlink parameters based on the received signals. The received signals may be transmitted by an access node, for example, the eNB 104, and may be referred to as downlink channel information.

The interference estimation circuitry 208 may receive the downlink parameters from the channel determination circuitry 204. The interference estimation circuitry 208 may then determine an interference profile associated with an interfering signal based on the determined downlink parameters of the interfering cell. Additionally/alternatively, the interference profile may be used by a receiver of the communication circuitry 212 to mitigate interference from a received signal.

Some or all of the communication circuitry 212, channel determination circuitry 204, and/or the interference estimation circuitry may be included in, for example, radio frequency (RF) circuitry or baseband circuitry as described below with respect to FIG. 8.

Figure 3:
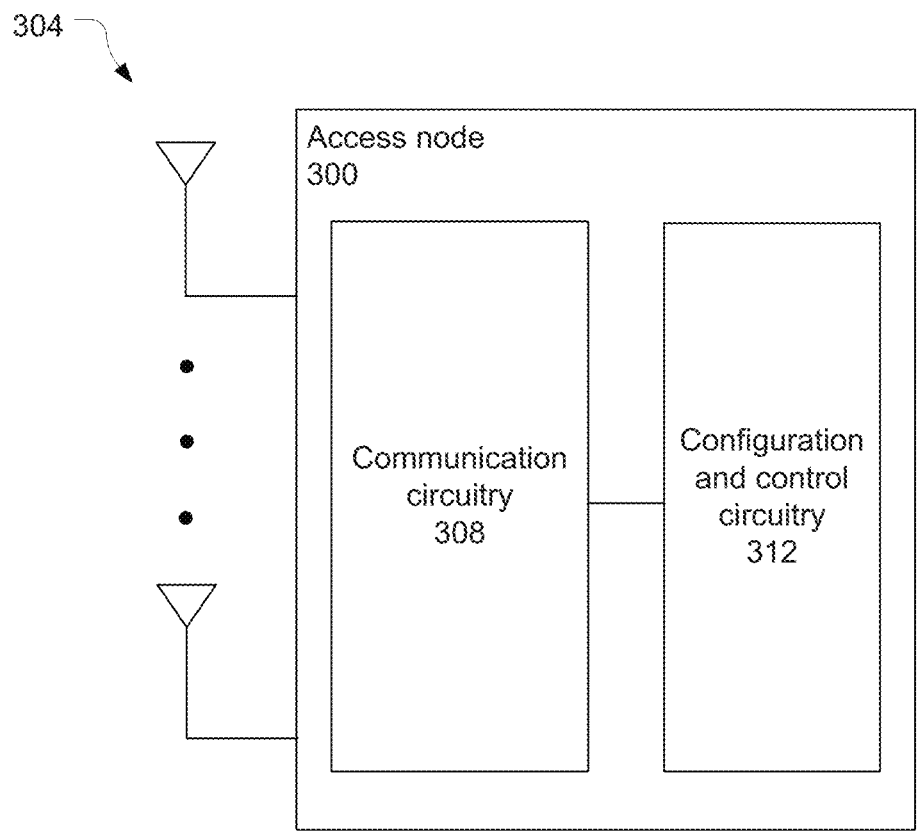
FIG. 3 is a block diagram of an illustrative access node in accordance with various embodiments.

FIG. 3 illustrates an access node 300 in accordance with some embodiments. In some embodiments, the access node 300 may be similar to and substantially interchangeable with eNBs 104 or 108.

The access node 300 may include one or more antennas 304, communication circuitry 308, and configuration and control circuitry 312 coupled with each other at least as shown.

Similar to communication circuitry 212, communication circuitry 308 may be coupled with the antennas 304 to facilitate over-the-air communication of signals to/from the access node 300.

The configuration and control circuitry 312 may transmit configuration and control information to UEs of a serving cell. The configuration and control information may include, for example, downlink channel information, downlink control information (DCI), radio resource control (RRC) configuration information, etc.

Some or all of the communication circuitry 308 and/or the configuration and control circuitry 312 may be included in, for example, RF circuitry or baseband circuitry as described below with respect to FIG. 8.

Figure 4:
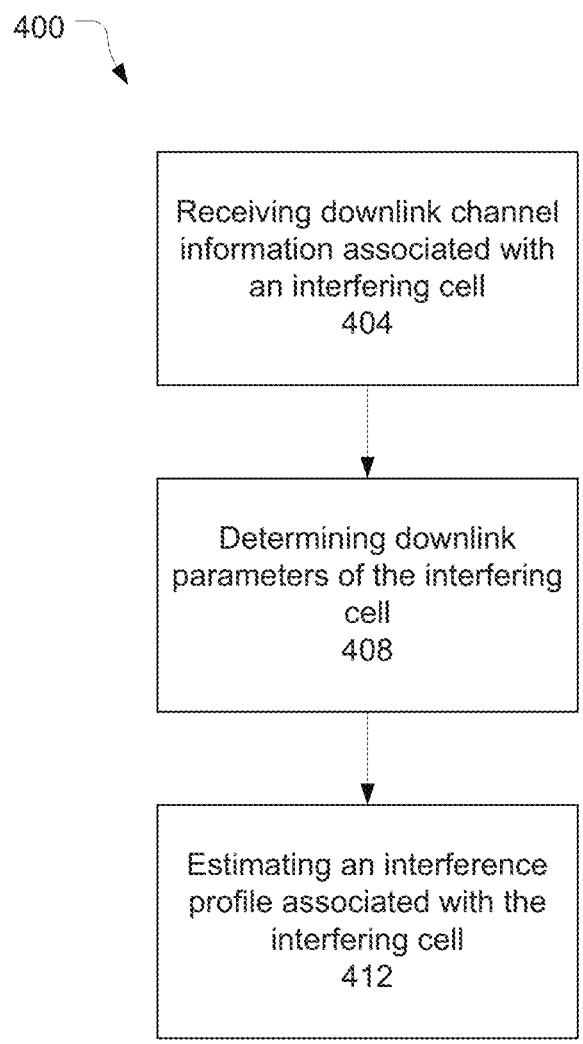
FIG. 4 is a flowchart describing a method in accordance with various embodiments.

FIG. 4 illustrates a method 400 in accordance with some embodiments. The method 400 may be performed by a UE such as UE 112 or 200. In some embodiments, the UE may include and/or have access to one or more computer-readable media having instructions stored thereon, that, when executed, cause the UE to perform the method 400. The UE may additionally/alternatively have circuitry configured to perform some or all of the operations described with respect to the method 400.

The method 400 may include, at 404, receiving downlink channel information associated with an interfering cell. In some embodiments, the receiving at 404 may be done by communication circuitry and/or channel determination circuitry of the UE. In some embodiments, the downlink channel information may be received in a semi-static configuration operation in which an access node configures a UE by transmitting configuration information using RRC signaling. An interfering cell may be, for example, a neighboring cell in which communications at least have a potential for interfering with signals within the serving cell.

The method may include, at 408, determining downlink parameters of the interfering cell. In some embodiments, the determining at 408 may be done by the channel determination circuitry of the UE. The downlink parameters of the interfering cell may be determined based on the downlink channel information received at 404 in, for example, the configuration operation. In some embodiments, the downlink parameters may be included in the downlink channel information. In other embodiments, the downlink parameters may be deduced from information provided in the downlink channel information. The downlink parameters of the interfering cell may include, for example, a quasi co-location (QCL) indicator to indicate whether an antenna port used for a reference signal or a PDSCH in the interfering cell is quasi co-located with another antenna port, or a mapping indicator to indicate an interfering PDSCH RE mapping.

In some embodiments, the downlink parameters may include a QCL indicator to indicate whether antenna ports 7-14 associated with an interfering PDSCH (for example, a PDSCH of an interfering cell) are quasi co-located with antenna ports 0-3 associated with a CRS of the interfering cell. This may be done by indicating, in the configuration of interfering UE-specific RS, a physical cell identity of co-located CRS transmitted by interfering cell. In other embodiments, the co-location between CRS and UE-specific RS of the interfering cell may be established when both reference signals are using the same scrambling identity, which is based on, and in some cases equal to, a physical cell identifier. The former may be achieved by signaling of QCL behavior (e.g. QCL behavior type A as defined in 3GPP Technical Specification (TS) 36.213 V11.4.0 (Sep. 20, 2013)) between UE-specific RS and CRS used within interfering cell. Having this QCL information may allow the channel determination circuitry to use the CRS transmitted from antenna ports 0-3 of the neighbor access node to estimate time and frequency offsets. The channel determination circuitry and/or communication circuitry may then use these estimated time and frequency offsets to demodulate the UE-specific reference signals transmitted by the neighbor access node. The demodulated UE-specific reference signals may be used by the channel determination circuitry to determine a channel of the interfering cell.

The method 400 may include, at 412, estimating an interference profile associated with the interfering cell. The estimating of the interference profile may be done by the interference estimation circuitry of the UE. In some embodiments, the interference profile may be based on the determined channel of the interfering cell. This interference profile may then be used by, for example, a receiver of the communication circuitry of the UE to mitigate interference.

In some embodiments, the downlink parameters may be used to semi-statically configure the UE with a parameter set that describes interfering PDSCH RE mapping. In some embodiments, the parameter set may include a number of CRS antenna ports for the interfering PDSCH RE mapping (for example, the antenna ports, either virtual or physical, of the neighbor access node over which the CRS transmissions are transmitted); a CRS frequency shift for the interfering PDSCH RE mapping (for example, a cell-specific frequency shift (e.g., in terms of number of subcarriers) that may be used by the neighbor access node to avoid constant collocation of reference signals from different cells); an MBSFN subframe configuration for the interfering PDSCH RE mapping (for example, a quantity and/or location of REs (e.g., subcarriers and/or OFDM symbols) of the OFDM frame that are dedicated to MBSFN information for the neighboring access node); a zero-power CSI-RS resource configuration for the interfering PDSCH RE mapping (e.g., a quantity and/or location of REs dedicated for zero-power CSI-RS for the neighboring access node); a non zero-power CSI-RS resource configuration for the interfering PDSCH RE mapping (e.g., a quantity and/or location of REs dedicated for zero-power CSI-RS for the neighboring access node); or a PDSCH starting position for interfering PDSCH RE mapping (to indicate where in the frame the interfering PDSCH starts). This information may be used by the channel determination circuitry of the UE to determine which REs are used to transmit the interfering PDSCH. The interference estimation circuitry may provide an interference profile, at 408, based on the interfering PDSCH and may, in conjunction with the communication circuitry, mitigate interference attributed to the interfering PDSCH by, for example, subtracting the interfering PDSCH from a received signal in order to decode a desired signal from a serving cell.

Figure 5:
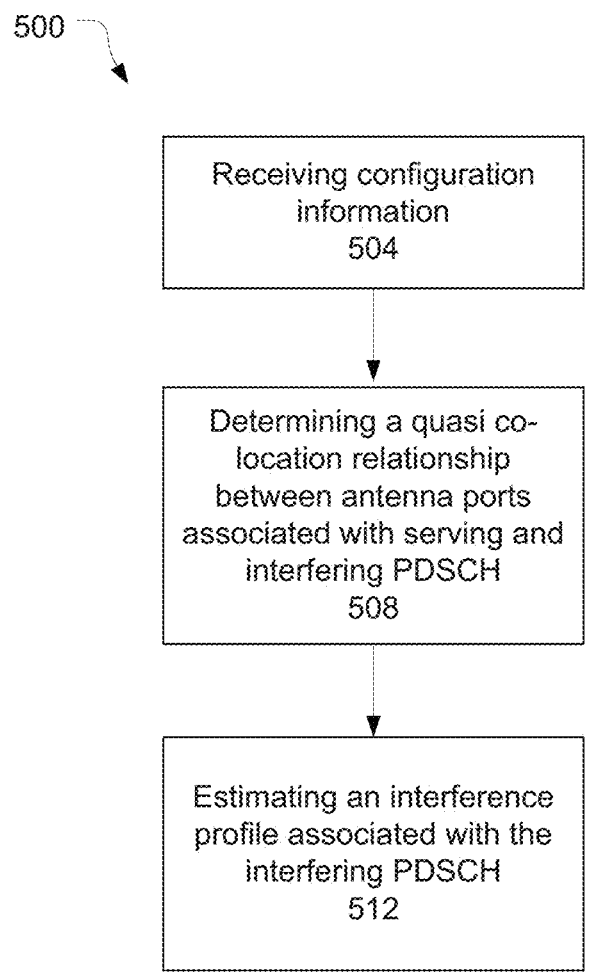
FIG. 5 is a flowchart describing a method in accordance with various embodiments.

FIG. 5 illustrates a method 500 in accordance with some embodiments. The method 500 may be performed by a UE such as UE 112 or 200. In some embodiments, the UE may include and/or have access to one or more computer-readable media having instructions stored thereon, that, when executed, cause the UE to perform the method 500. The UE may additionally/alternatively have circuitry configured to perform some or all of the operations described with respect to the method 500.

The method 500 may include, at 504, receiving configuration information. In some embodiments, the receiving at 504 may be done by communication circuitry and/or channel determination circuitry of the UE. In some embodiments, the configuration information may be received in a semi-static configuration operation in which an access node configures a UE using RRC signaling.

LTE allows one PRB to transmit multiple PDSCHs to different UEs. Thus, the interfering PDSCH may be either from the same serving cell as the serving PDSCH (e.g., in MU-MIMO), for example, intra-cell interference, or from a neighboring serving cell, for example, inter-cell interference. In general, the UE may not know whether the UE-RS ports for interfering signals are transmitted from the serving access node or a neighboring access node. Therefore, in some embodiments, the configuration information may include an indication of a quasi co-location relationship between on or more antenna ports associated with a serving PDSCH and one or more antenna ports associated with an interfering PDSCH. The method 500 may include, at 508, determining the quasi co-location relationship between the antenna ports associated with a serving PDSCH and the antenna ports associated with an interfering PDSCH.

In some embodiments, the access node may configure the UE (by, for example, providing appropriate configuration information through RRC signaling) with QCL behavior type C, distinguished from QCL behavior types A and B as defined in TS 36.213. In some embodiments, a QCL behavior type C may be associated with particular QCL and mapping relationships. For example, in some embodiments, a QCL behavior type C may indicate that the antenna ports 7-14 associated with the interfering PDSCH cannot be assumed as quasi co-located with antenna ports 7-14 associated with the serving PDSCH. Thus, the QCL behavior type C may indicate that the interfering PDSCH is not transmitted from the same serving cell as the serving PDSCH. The serving PDSCH RE mapping may be signaled by downlink control information (DCI) as described below.

A UE configured in TM10 (or a transmission mode based on TM10) for a given serving cell may be configured, for example by an access node providing the UE with appropriate configuration information through RRC signaling, with up to four parameter sets. A mapping value transmitted in DCI may then be used to decode the serving PDSCH. In some embodiments, the mapping value may be set in a PDSCH RE mapping and quasi co-location indicator field in a detected PDCCH/EPDCCH with DCI format 2D for determining the serving PDSCH RE mapping and serving PDSCH antenna port quasi co-location. For a PDSCH without a corresponding PDCCH, the UE may use the parameter set indicated by mapping value in DCI of PDCCH/EPDCCH with DCI format 2D corresponding to the associated semi-persistent scheduling (SPS) activation for determining the serving PDSCH RE mapping and serving PDSCH antenna port quasi co-location.

Each parameter set of the plurality of parameter sets configured by higher layers, may define mapping and QCL parameters of the serving PDSCH such as: a number of CRS antenna ports for the serving PDSCH RE mapping; a CRS frequency shift for the serving PDSCH RE mapping; an MBSFN subframe configuration for the serving PDSCH RE mapping; a zero-power CSI-RS resource configuration for the serving PDSCH RE mapping; a PDSCH starting position for serving PDSCH RE mapping; and/or a CSI-RS resource configuration identity for quasi co-location.

It may be noted that a serving PDSCH is mapped around all configured non-zero power CSI-RS resources. Therefore, there is no non zero-power CSI-RS resource in the serving PDSCH RE mapping set. However, given that an interfering PDSCH may be mapped around the CSI-RS associated with the interfering cell, the parameter set associated with the interfering PDSCH RE mapping set may further include the non zero-power CSI-RS resource configuration. See, for example, the parameter set described above with respect to FIG. 4.

The method 500 may further include, at 512, estimating an interference profile associated with the configuration information and the quasi co-location relationship between the antenna ports of the serving and interfering PDSCH. As described above, a receiver of the communication circuitry of the UE may mitigate interference of the interfering PDSCH based on the interference profile.

In some embodiments, the QCL behavior type C may indicate additional/alternative QCL relationships and may be supported by additional/alternative parameters sets with which the UE may be configured. For example, in some embodiments, the UE may be configured with parameter sets that include mapping and QCL parameters of the interfering PDSCH as well as the serving PDSCH.

Figure 6:
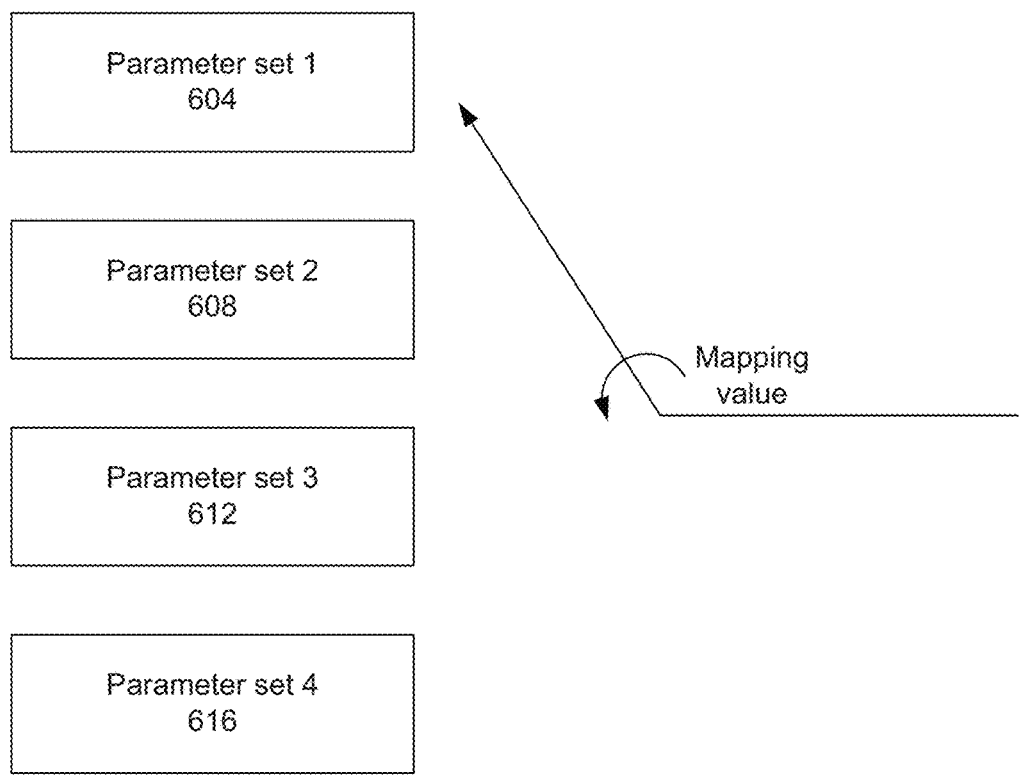
FIG. 6 conceptually illustrates selection of a parameter set in accordance with various embodiments.

FIG. 6 conceptually illustrates selection of a parameter set in accordance with various embodiments. In this embodiment, a UE, which may be configured in TM10 or transmission mode based on TM10) may be configured, by RRC signalling, with four parameter sets 604, 608, 612, and 616. Each parameter set may include parameters that correspond to RE mapping and QCL behaviour for both serving and interfering PDSCHs to allow a UE to decode serving PDSCH and interfering PDSCH. For example, each parameter set may include: a number of CRS antenna ports for serving PDSCH RE mapping; a CRS frequency shift for serving PDSCH RE mapping; an MBSFN subframe configuration for serving PDSCH RE mapping; a zero-power CSI-RS resource configuration for serving PDSCH RE mapping; a PDSCH starting position for serving PDSCH RE mapping; a CSI-RS resource configuration identity for quasi co-location; a number of CRS antenna ports for interfering PDSCH RE mapping; a CRS frequency shift for interfering PDSCH RE mapping; an MBSFN subframe configuration for interfering PDSCH RE mapping; a zero-power CSI-RS resource configuration for interfering PDSCH RE mapping; a non zero-power CSI-RS resource configuration for interfering PDSCH RE mapping; a PDSCH starting position for interfering PDSCH RE mapping; and/or a CSI-RS resource configuration identity for quasi co-location with antenna ports of interfering PDSCH.

Similar to that described above, the DCI may include a mapping value that the UE may use to select one of the plurality of configured parameter sets. In this embodiment, the mapping value may be a two-bit value in order to indicate one of the four parameter sets 604, 608, 612, and 616. In some embodiments, the mapping value may be set in a PDSCH RE mapping and quasi co-location indicator field in a detected PDCCH/EPDCCH with DCI format 2D (or the like) for determining the serving PDSCH RE mapping, the interfering PDSCH RE mapping, the serving PDSCH antenna port quasi co-location, and the interfering PDSCH antenna port quasi co-location. For a PDSCH without a corresponding PDCCH, the UE may use the parameter set indicated in the PDCCH/EPDCCH with DCI format 2D (or the like) corresponding to the associated SPS activation for determining the serving PDSCH RE mapping, the interfering PDSCH RE mapping, the serving PDSCH antenna port quasi co-location, and the interfering PDSCH antenna port quasi co-location.

In some embodiments, when the UE is configured for QCL behavior type C, the QCL relationships may be assumed as follows. The antenna ports 7-14 associated with the serving PDSCH and antenna ports 7-14 associated with the interfering PDSCH may not be assumed as quasi co-located; antenna ports 15-22 corresponding to the serving CSI-RS resource configuration (identified by the CSI-RS resource configuration identity for serving PDSCH RE mapping of the selected parameter set) and the antenna ports 7-14 associated with the serving PDSCH may be assumed to be quasi co-located with respect to Doppler shift, Doppler spread, average delay, and delay spread; and the antenna ports 15-22 corresponding to the interfering CSI-RS resource configuration (identified by the CSI-RS resource configuration identity for interfering PDSCH RE mapping of the selected parameter set) and the antenna ports 7-14 associated with the interfering PDSCH may be assumed to be quasi co-located with respect to Doppler shift, Doppler spread, average delay, and delay spread.

In some embodiments, when the UE is configured for QCL behaviour type C, DCI-based signalling may be used to indicate quasi-location between antenna ports of one CSI-RS (among four configured) and UE-specific RS antenna ports of interfering PDSCH with respect to, for example, delay spread, Doppler spread, Doppler shift, and average delay.

Figure 7:
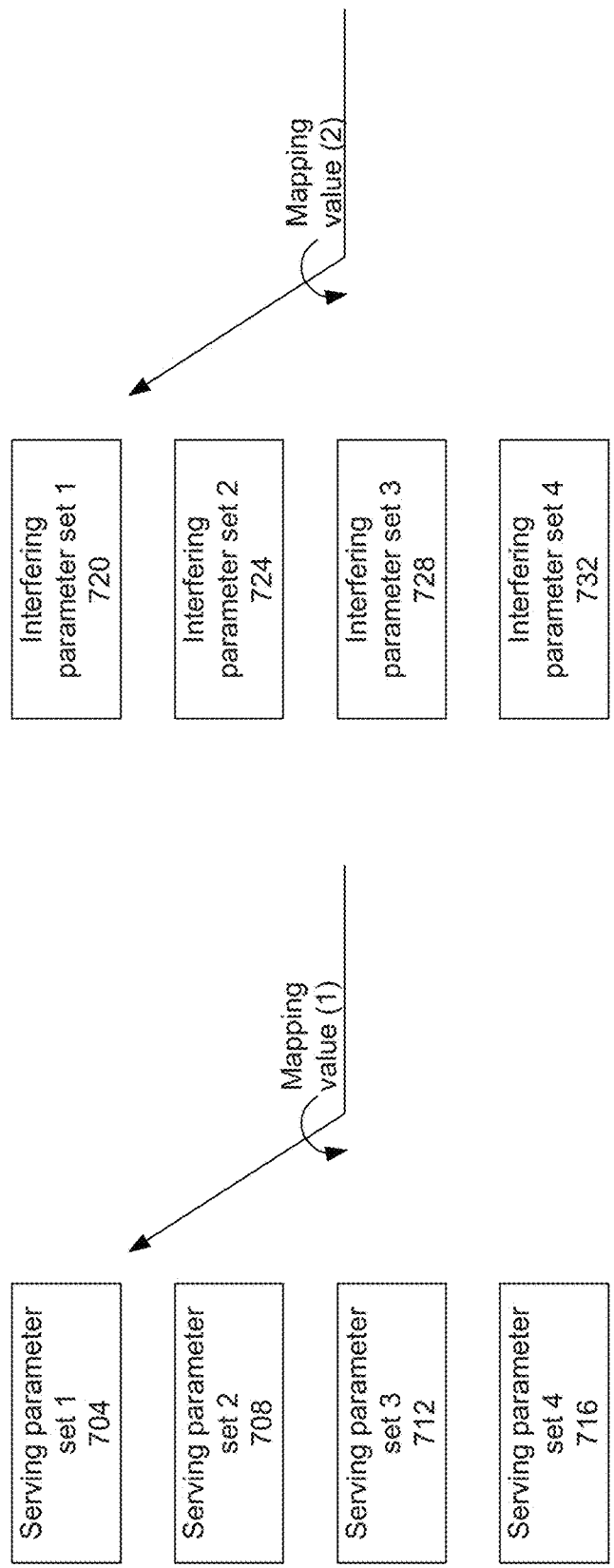
FIG. 7 conceptually illustrates selection of parameter sets in accordance with various embodiments.

In some embodiments, other configuration of parameter sets and signalling of the same may be done in additional/alternative ways. For example, FIG. 7 conceptually illustrates selection of parameter sets in accordance with various embodiments. In this embodiment, a UE may configured with QCL behaviour type C and TM10 (or transmission mode based on TM10) as described above. However, the UE may be configured with four parameter sets that correspond to the serving PDSCH, for example, serving parameter set 1 704, serving parameter set 2 708, serving parameter set 3 712, and serving parameter set 4 716; and may further be configured with four parameter sets that correspond to the interfering PDSCH, for example, serving parameter set 1 720, serving parameter set 2 724, serving parameter set 3 728, and serving parameter set 4 732. In some embodiments, each parameter set may include a PDSCH RE mapping for a corresponding PDSCH. For example, serving parameter sets 704, 708, 712, and 716 may indicate respective PDSCH RE mapping and QCL states for decoding serving PDSCH. Similarly, serving parameter sets 720, 724, 728, and 732 may indicate respective PDSCH RE mapping and QCL states for decoding interfering PDSCH.

A first mapping value in DCI of a detected PDCCH/EPDCCH with DCI format 2D (or the like) may indicate one of the serving parameter sets 704, 708, 712, or 716; while a second mapping value in DCI of a detected PDCCH/EPDCCH with DCI format 2D (or the like) may indicate one of the interfering parameter sets 720, 724, 728, or 732. The first and second mapping values, which may each be two-bit values in this embodiment, may be transmitted in the same or in different DCI transmissions.

While the above embodiments describe four parameters sets, other embodiments may include other numbers of parameter sets. In an embodiment in which the UE is configured with only one interfering PDSCH parameter set, DCI-based selection may not be required for selection. Thus, for example, the channel determination circuitry may determine the downlink parameters of the configured interfering PDSCH parameter set independent of DCI signalling.

Embodiments described above provide for the configuration and signalling of mapping and QCL information that may allow a UE to decode, or otherwise determine properties of, an interfering PDSCH. This may, in turn, be used to mitigate interference of the PDSCH of the serving cell. Other embodiments may include similar concepts applied to EPDCCH, given that the EPDCCH is transmitted in the resource elements of the PDSCH region.

Figure 8:
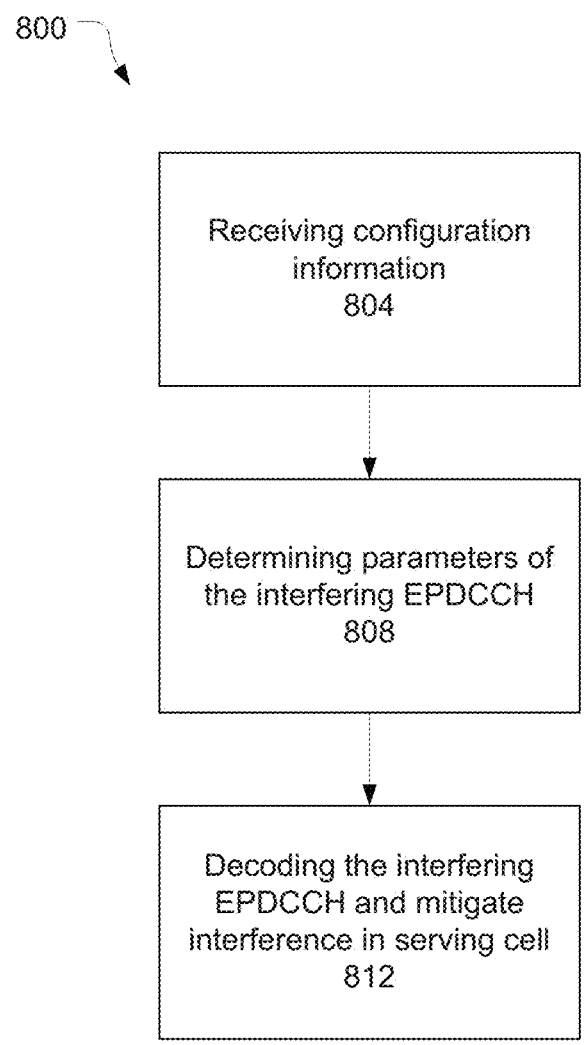
FIG. 8 is a flowchart describing a method in accordance with various embodiments.

FIG. 8 illustrates a method 800 in accordance with some embodiments. The method 800 may be performed by a UE such as UE 112 or 200. In some embodiments, the UE may include and/or have access to one or more computer-readable media having instructions stored thereon, that, when executed, cause the UE to perform the method 800. The UE may additionally/alternatively have circuitry configured to perform some or all of the operations described with respect to the method 800.

The method 800 may include, at 804, receiving configuration information. The receipt of configuration information may be done as a semi-static configuration operation in which the configuration information is transmitted to the UE from an access node using RRC signaling.

The method 800 may further include, at 808, determining parameters of the interfering EPDCCH based on the configuration information. In some embodiments, the configuration information may indicate that the UE is to be configured with QCL behavior type C that utilizes the following assumptions. Antenna ports 107-110 associated with a monitored EPDCCH and antenna ports 107-110 associated with interfering EPCCH may not be assumed as quasi co-located; antenna ports 15-22 corresponding to the CSI-RS resource configuration identity for serving PDSCH RE mapping of a selected parameter set may be considered as quasi co-located with respect to Doppler shift, Doppler spread, average delay, and delay spread; and antenna ports 15-22 corresponding to the CSI-RS resource configuration identity for interfering PDSCH RE mapping and antenna ports 107-110 of interfering EPDCCH (or antenna ports 7-14 of interfering PDSCH) may be quasi co-located with respect to Doppler shift, Doppler spread, average delay, and delay spread.

In some embodiments, the configuration information may further include a number of parameter sets having the following parameters for determining RE mapping and quasi co-location behavior of an interfering EPDCCH. These parameters may include, for example, an interfering EPDCCH resource allocation; a number of CRS antenna ports for interfering PDSCH RE mapping; a CRS frequency shift for interfering PDSCH RE mapping; an MBSFN subframe configuration for interfering PDSCH RE mapping; a zero-power CSI-RS resource configuration for interfering PDSCH RE mapping; a non zero-power CSI-RS resource configuration for interfering PDSCH RE mapping; a PDSCH starting position for PDSCH RE mapping; and/or a CSI-RS resource configuration identity for quasi co-location with antenna ports of interfering PDSCH. While many of the parameter names are stated to be "PDSCH" parameters, these parameters may also be applicable to EPDCCH processing and, in some embodiments, may be referred to as "EPDCCH" parameters.

The method 800 may include, at 812, decoding the interfering EPDCCH and mitigating interference in a serving cell. The decoding of the EPDCCH may be enabled by the UE having knowledge of the interfering EPDCCH parameters conveyed in the configuration information. Having decoded the EPDCCH, the UE may be able to subtract the EPDCCH from a desired signal transmitted by the serving cell access node as described above.

Figure 9:
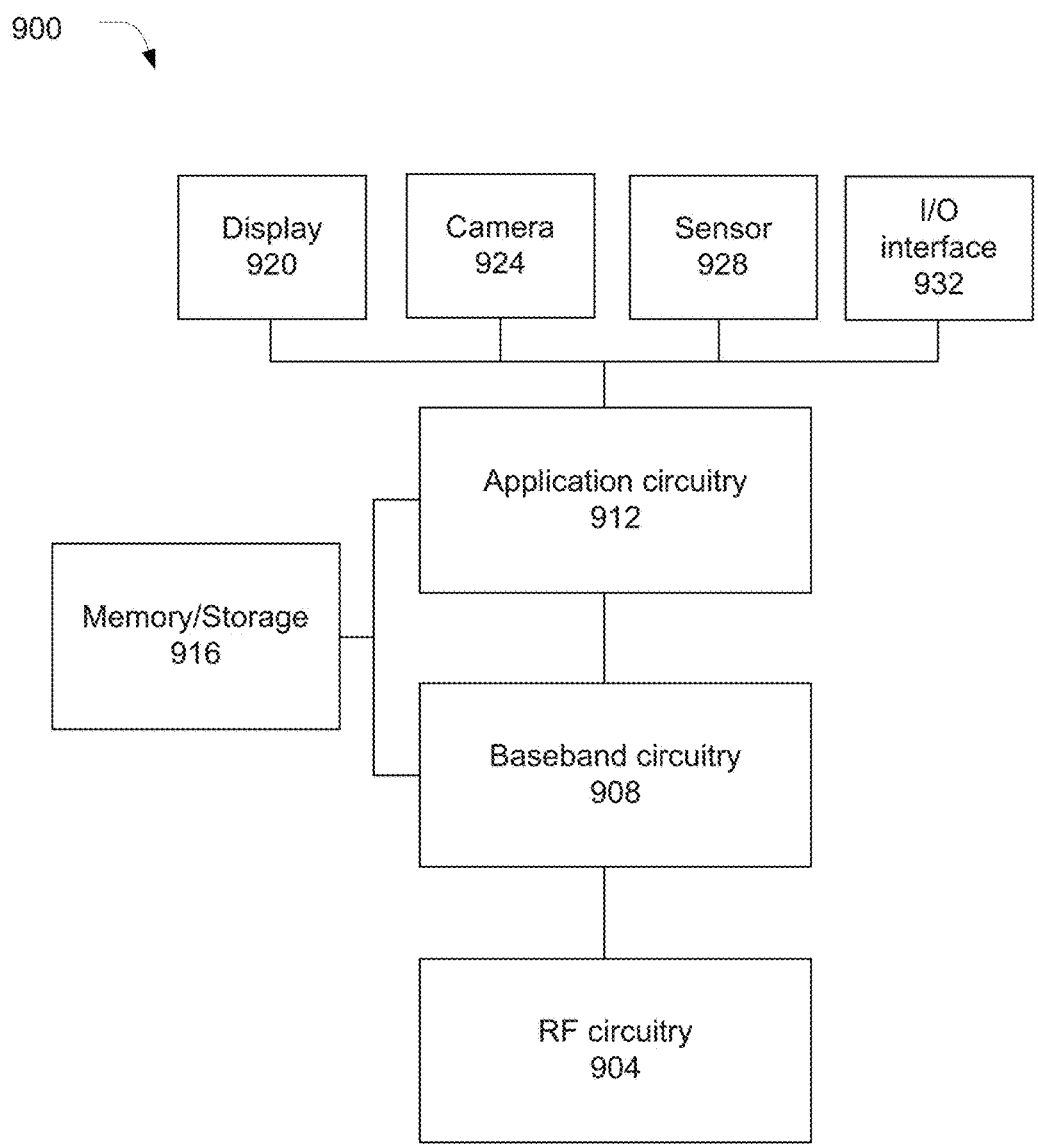
FIG. 9 is a block diagram of an example computing device that may be used to practice various embodiments described herein.

A UE and access node described herein may be implemented into a system using any suitable hardware and/or software to configure as desired. FIG. 9 illustrates, for one embodiment, an example system 900 comprising radio frequency (RF) circuitry 904, baseband circuitry 908, application circuitry 912, memory 916, display 920, camera 924, sensor 928, and input/output (I/O) interface 932, coupled with each other at least as shown.

The application circuitry 912 may include circuitry such as, but not limited to, one or more single-core or multi-core processors. The processor(s) may include any combination of general-purpose processors and dedicated processors (e.g., graphics processors, application processors, etc.). The processors may be coupled with memory 916 and configured to execute instructions stored in the memory 916 to enable various applications and/or operating systems running on the system 900.

The baseband circuitry 908 may include circuitry such as, but not limited to, one or more single-core or multi-core processors such. The processor(s) may include a baseband processor. The baseband circuitry 908 may handle various radio control functions that enables communication with one or more radio networks via the RF circuitry. The radio control functions may include, but are not limited to, signal modulation, encoding, decoding, radio frequency shifting, etc. In some embodiments, the baseband circuitry 908 may provide for communication compatible with one or more radio technologies. For example, in some embodiments, the baseband circuitry 908 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 908 is configured to support radio communications of more than one wireless protocol may be referred to as multi-mode baseband circuitry.

In various embodiments, baseband circuitry 908 may include circuitry to operate with signals that are not strictly considered as being in a baseband frequency. For example, in some embodiments, baseband circuitry 908 may include circuitry to operate with signals having an intermediate frequency, which is between a baseband frequency and a radio frequency.

RF circuitry 904 may enable communication with wireless network using modulated electromagnetic radiation through a non-solid medium. In various embodiments, the RF circuitry 904 may include switches, filters, amplifiers, etc. to facilitate the communication with the wireless network.

In various embodiments, RF circuitry 904 may include circuitry to operate with signals that are not strictly considered as being in a radio frequency. For example, in some embodiments, RF circuitry 904 may include circuitry to operate with signals having an intermediate frequency, which is between a baseband frequency and a radio frequency.

In some embodiments, some or all of the constituent components of the baseband circuitry 908, the application circuitry 912, and/or the memory 916 may be implemented together on a system on a chip (SOC).

In an embodiment in which the system 900 represents an access node, for example, access node 300, the communication circuitry of the access node may be implemented in the RF circuitry 904 and/or the baseband circuitry 908 and the configuration and control circuitry may be implemented in the baseband circuitry 908 and/or application circuitry 912.

In an embodiment in which the system 900 represents a UE, for example, UE 200, the components of the UE, for example, communication circuitry, channel determination circuitry, and interference estimation circuitry, may be implemented in the RF circuitry 904 and/or the baseband circuitry 908.

Memory/storage 916 may be used to load and store data and/or instructions, for example, for system 900. Memory/storage 916 for one embodiment may include any combination of suitable volatile memory (e.g., dynamic random access memory (DRAM)) and/or non-volatile memory (e.g., Flash memory).

In various embodiments, the I/O interface 932 may include one or more user interfaces designed to enable user interaction with the system 900 and/or peripheral component interfaces designed to enable peripheral component interaction with the system 900. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 928 may include one or more sensing devices to determine environmental conditions and/or location information related to the system 900. In some embodiments, the sensors may include, but are not limited to, a gyro sensor, an accelerometer, a proximity sensor, an ambient light sensor, and a positioning unit. The positioning unit may also be part of, or interact with, the baseband circuitry 908 and/or RF circuitry 904 to communicate with components of a positioning network, e.g., a global positioning system (GPS) satellite.

In various embodiments, the display 920 may include a display (e.g., a liquid crystal display, a touch screen display, etc.).

In various embodiments, the system 900 may be a mobile computing device such as, but not limited to, a laptop computing device, a tablet computing device, a netbook, an ultrabook, a smartphone, etc. In various embodiments, system 900 may have more or less components, and/or different architectures.

The following paragraphs describe examples of various embodiments.

Example 1 includes an apparatus to be employed in user equipment, the apparatus comprising: channel determination circuitry: to receive, from an access node associated with a serving cell of a RAN, downlink channel information associated with an interfering cell; determine, based on the downlink channel information, downlink parameters of the interfering cell, the downlink parameters including an indicator to indicate: whether an antenna port used for a reference signal or a PDSCH in the interfering cell is quasi co-located with another antenna port; or an interfering PDSCH RE mapping; and interference estimation circuitry coupled with the channel determination circuitry, the interference estimation circuitry to estimate an interference profile associated with the interfering cell based on the determined downlink parameters of the interfering cell.

Example 2 is the apparatus of example 1, wherein the channel determination circuitry is semi-statically configured with the downlink channel information based on radio resource control signaling.

Example 3 is the apparatus of example 1 or 2, wherein the indicator is a quasi co-location indicator to indicate whether antenna ports 7-14 associated with a PDSCH of the interfering cell are quasi co-located, with respect to Doppler shift, Doppler spread, average delay, and/or delay spread, with antenna ports 0-3 associated with a CRS of the interfering cell.

Example 4 is the apparatus of example 3, wherein the CRS and a UE-specific reference signal of the interfering cell have a common scrambling identity that is based on a physical cell identity of the interfering cell.

Example 5 is the apparatus of example 3, wherein configuration of UE-specific reference signal of the interfering cell includes a physical cell identity of the CRS of the interfering cell.

Example 6 is the apparatus of examples 1 or 2, wherein the downlink parameters include a: a number of CRS antenna ports for the interfering PDSCH RE mapping; a CRS frequency shift for the interfering PDSCH RE mapping; an MBSFN subframe configuration for the interfering PDSCH RE mapping; a zero-power CSI-RS resource configuration for the interfering PDSCH RE mapping; a non zero-power CSI-RS resource configuration for the interfering PDSCH RE mapping; and/or a PDSCH starting position for interfering PDSCH RE mapping.

Example 7 is the apparatus of example 6, wherein the indicator corresponds to: zero-power CSI-RS resource configuration for the interfering PDSCH RE mapping.

Example 8 is the apparatus of example 6, wherein the channel determination circuitry is configured with only one parameter set that includes the downlink parameters and the channel determination circuitry is to determine the downlink parameters independent of DCI signaling.

Example 9 is a user equipment comprising: a multi-mode baseband circuitry including: first circuitry having the apparatus of example 1 to communicate with the RAN, wherein the RAN utilizes a LTE protocol; and second circuitry to communicate with a wireless network that utilizes a wireless protocol that is different from the LTE protocol.

Example 10 is an apparatus to be employed in a user equipment, the apparatus comprising: channel determination circuitry to receive configuration information that includes an indication of a quasi co-location relationship between one or more antenna ports associated with a serving PDSCH and one or more antenna ports associated with an interfering PDSCH; and interference estimation circuitry coupled with the channel determination circuitry, the interference estimation circuitry to estimate an interference profile associated with the interfering PDSCH based on the configuration information.

Example 11 is the apparatus of example 10, wherein the channel determination circuitry is to receive the configuration information as part of being semi-statically configured by an access node using radio resource control signaling.

Example 12 is the apparatus of examples 10 or 11, wherein the quasi co-location relationship is that antenna ports 7-14 associated with the serving PDSCH are not quasi co-located with antenna ports 7-14 associated with the interfering PDSCH.

Example 13 is the apparatus of examples 10 or 11, wherein the channel determination circuitry is to determine that interfering PDSCH RE mappings follows serving PDSCH RE mapping based on the configuration information Example 14 is the apparatus of example 13, wherein the channel determination circuitry is further to determine the serving PDSCH RE mapping based on DCI received in PDCCH or an EPDCCH.

Example 15 is one or more non-transitory computer-readable media having instructions that, when executed, cause a user equipment to: store a plurality of parameter sets, with individual parameter sets including parameters that correspond to RE mapping or QCL behavior for an interfering PDSCH; and obtain DCI from a PDCCH or an EPDCCH; select, based on the DCI, a parameter set from the plurality of parameter sets; and decode signals received from a serving cell based on the selected parameter set.

Example 16 is the one or more computer-readable media of example 15, wherein the DCI includes two bits and the plurality of parameter sets includes four parameter sets with individual parameter sets including RE mapping and QCL behavior for both serving and interfering PDSCH.

Example 17 is the one or more non-transitory computer-readable media of example 15, wherein the individual parameter sets include a number of CRS antenna ports for interfering PDSCH RE mapping; a CRS frequency shift for interfering PDSCH RE mapping; an MBSFN subframe configuration for interfering PDSCH RE mapping; a zero-power CSI-RS resource configuration for interfering PDSCH RE mapping; a PDSCH starting position for interfering PDSCH RE mapping; and/or a CSI-RS resource configuration identity for quasi co-location with antenna ports of interfering PDSCH Example 18 is the one or more non-transitory computer-readable media of example 17, wherein the individual parameter sets further include a number of CRS antenna ports for serving PDSCH RE mapping; a CRS frequency shift for serving PDSCH RE mapping; an MBSFN subframe configuration for serving PDSCH RE mapping; a zero-power CSI-RS resource configuration for serving PDSCH RE mapping; a PDSCH starting position for serving PDSCH RE mapping; and/or a CSI-RS resource configuration identity for quasi co-location.

Example 19 is the one or more non-transitory computer-readable media of example 15, wherein the instructions, when executed, further cause a user equipment to: configure with a QCL behavior type based on configuration information, the QCL behavior type to indicate that antenna ports 15-22 corresponding to a CSI-RS resource configuration identified by a CSI-RS resource configuration identity for interfering PDSCH RE mapping of a selected parameter set is quasi co-located with antenna ports 7-14 associated with the interfering PDSCH with respect to Doppler shift, Doppler spread, average delay, and/or delay spread.

Example 20 is the one or more non-transitory computer-readable media of example 15, wherein the plurality of parameter sets is a first plurality of parameter sets, the parameter set is a first parameter set, and the instructions, when executed, further cause the UE to: store a second plurality of parameter sets, with individual parameter sets of the second plurality including parameters that correspond to RE mapping or QCL behavior for a serving PDSCH; select, based on the DCI, a second parameter set from the second plurality of parameter sets; and decode signals received from the serving cell based further on the selected second parameter set.

Example 21 is a method comprising: receiving configuration information that includes parameters that correspond to REmapping and quasi co-location behavior of an interfering EPDCCH; decoding the interfering EPDCCH based on the parameters; and mitigating interference on a signal from an access node of a serving cell based on the decoded interfering EPDCCH.

Example 22 is the method of example 21, wherein receiving the configuration information is a result of a semi-static configuration operation.

Example 23 is the method of example 22, wherein the semi-static configuration operation uses radio resource control signaling.

Example 24 is the method of any of examples 21-23, wherein the parameters comprise: an EPDCCH resource allocation; a number of CRS antenna ports for interfering PDSCH RE mapping; a CRS frequency shift for interfering PDSCH RE mapping; an MBSFN subframe configuration for interfering PDSCH RE mapping; a zero-power CSI-RS resource configuration for interfering PDSCH RE mapping; a PDSCH starting position for PDSCH RE mapping; and/or a CSI-RS resource configuration identity for quasi co-location with antenna ports of interfering PDSCH.

Example 25 is the method of any of examples 21-23, further comprising: configuring a user equipment with a QCL behavior type based on the received configuration information.

Example 26 is the method of example 25, wherein said QCL behavior type indicates antenna ports 107-110 associated with a monitored EPDCCH and antenna ports 107-110 associated with interfering.

Example 27 is one or more non-transitory computer-readable media having instructions that, when executed, cause a user equipment to perform the method of any of examples 21-23.

Example 28 is a user equipment to perform the method of any of examples 21-23.

Example 29 is a UE comprising: means to store a plurality of parameter sets, with individual parameter sets including parameters that correspond to RE mapping or QCL behavior for an interfering PDSCH; means to obtain DCI from a PDCCH or an EPDCCH; means to select, based on the DCI, a parameter set from the plurality of parameter sets; and means to decode signals received from a serving cell based on the selected parameter set.

Example 30 is the UE of example 29, wherein the DCI includes two bits and the plurality of parameter sets includes four parameter sets with individual parameter sets including RE mapping and QCL behavior for both serving and interfering PDSCH.

Example 31 is the UE of example 29, wherein the individual parameter sets include a number of CRS antenna ports for interfering PDSCH RE mapping; a CRS frequency shift for interfering PDSCH RE mapping; an MBSFN subframe configuration for interfering PDSCH RE mapping; a zero-power CSI-RS resource configuration for interfering PDSCH RE mapping; a PDSCH starting position for interfering PDSCH RE mapping; and/or a CSI-RS resource configuration identity for quasi co-location with antenna ports of interfering PDSCH Example 32 is the UE of example 31, wherein the individual parameter sets further include a number of CRS antenna ports for serving PDSCH RE mapping; a CRS frequency shift for serving PDSCH RE mapping; an MBSFN subframe configuration for serving PDSCH RE mapping; a zero-power CSI-RS resource configuration for serving PDSCH RE mapping; a PDSCH starting position for serving PDSCH RE mapping; and/or a CSI-RS resource configuration identity for quasi co-location.

Example 33 is the UE of example 29, further comprising: means to configure with a QCL behavior type based on configuration information, the QCL behavior type to indicate that antenna ports 15-22 corresponding to a CSI-RS resource configuration identified by a CSI-RS resource configuration identity for interfering PDSCH RE mapping of a selected parameter set is quasi co-located with antenna ports 7-14 associated with the interfering PDSCH with respect to Doppler shift, Doppler spread, average delay, and/or delay spread.

Example 34 is the UE of example 29, wherein the plurality of parameter sets is a first plurality of parameter sets, the parameter set is a first parameter set, and the UE further includes: means to store a second plurality of parameter sets, with individual parameter sets of the second plurality including parameters that correspond to RE mapping or QCL behavior for a serving PDSCH; means to select, based on the DCI, a second parameter set from the second plurality of parameter sets; and means to decode signals received from the serving cell based further on the selected second parameter set.

Example 35 is an access node having circuitry to: configure a user equipment with an indication of a quasi co-location relationship between one or more antenna ports associated with a serving PDSCH and one or more antenna ports associated with an interfering PDSCH.

Example 36 is the access node of example 35, wherein the circuitry is further to: configure the user equipment with one or more parameter sets, with individual parameter sets including parameters that correspond to RE mapping or QCL behavior for the interfering PDSCH.

Example 37 is the access node of example 35, wherein the circuitry is further to: configure, using radio resource control signaling, the user equipment with a plurality of parameter sets, with individual parameter sets including parameters that correspond to RE mapping or QCL behavior for the interfering PDSCH; and select, using downlink control information, one of the plurality of parameter sets to inter-ference estimation at the user equipment.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus to be employed in user equipment, the apparatus comprising:
channel determination circuitry to:
receive, from an access node associated with a serving cell of a radio access network (RAN), downlink channel information associated with an interfering cell; and
determine, based on the downlink channel information, downlink parameters of the interfering cell, the downlink parameters including an indicator to indicate: whether an antenna port used for a reference signal or a physical downlink shared channel (PDSCH) in the interfering cell is quasi co-located with another antenna port; or an interfering PDSCH resource element (RE) mapping; and interference estimation circuitry coupled with the channel determination circuitry, the interference estimation circuitry to estimate an interference profile associated with the interfering cell based on the determined downlink parameters of the interfering cell, wherein the downlink parameters of the interfering cell include:
- a number of common reference signal (CRS) antenna ports for the interfering PDSCH RE mapping;
- a CRS frequency shift for the interfering PDSCH RE mapping;
- a multicast-broadcast single-frequency network (MB-SFN) subframe configuration for the interfering PDSCH RE mapping;
- a zero-power channel state information-reference signal (CSI-RS) resource configuration for the interfering PDSCH RE mapping;
- a non zero-power CSI-RS resource configuration for the interfering PDSCH RE mapping; and/or
- a PDSCH starting position for the interfering PDSCH RE mapping.

2. The apparatus of claim 1, wherein the channel determination circuitry is semi-statically configured with the downlink channel information based on radio resource control signaling.

3. The apparatus of claim 1, wherein the indicator is a quasi co-location indicator to indicate whether antenna ports 7-14 associated with a PDSCH of the interfering cell are quasi co-located, with respect to Doppler shift, Doppler spread, average delay, and/or delay spread, with antenna ports 0-3 associated with a CRS of the interfering cell.

4. The apparatus of claim 3, wherein the CRS and a user equipment (UE)-specific reference signal of the interfering cell have a common scrambling identity that is based on a physical cell identity of the interfering cell.

5. The apparatus of claim 3, wherein configuration of a user equipment (UE)-specific reference signal of the interfering cell includes a physical cell identity of the CRS of the interfering cell.

6. The apparatus of claim 1, wherein the indicator corresponds to: zero-power CSI-RS resource configuration for the interfering PDSCH RE mapping.

7. The apparatus of claim 1, wherein the channel determination circuitry is configured with only one parameter set that includes the downlink parameters and the channel determination circuitry is to determine the downlink parameters independent of downlink control information (DCI) signaling.

8. An apparatus to be employed in a user equipment, the apparatus comprising:
channel determination circuitry to receive configuration information that includes an indication of a quasi co-location relationship between one or more antenna ports associated with a serving physical downlink shared channel (PDSCH) and one or more antenna ports associated with an interfering PDSCH; and
interference estimation circuitry coupled with the channel determination circuitry, the interference estimation circuitry to estimate an interference profile associated with the interfering PDSCH based on the configuration information,
wherein the quasi co-location relationship is that antenna ports 7-14 associated with the serving PDSCH are not quasi co-located with antenna ports 7-14 associated with the interfering PDSCH.

9. The apparatus of claim 8, wherein the channel determination circuitry is to receive the configuration information as part of being semi-statically configured by an access node using radio resource control signaling.

10. The apparatus of claim 8, wherein the channel determination circuitry is to determine that interfering PDSCH RE mapping follows serving PDSCH RE mapping based on the configuration information.

11. The apparatus of claim 10, wherein the channel determination circuitry is further to determine the serving PDSCH RE mapping based on downlink control information (DCI) received in a physical downlink control channel (PDCCH) or an enhanced physical downlink control channel (EPDCCH).

12. One or more non-transitory computer-readable media having instructions that, when executed by one or more processors, cause a user equipment to:
store a plurality of parameter sets, with individual parameter sets including parameters that correspond to resource element (RE) mapping or quasi co-location (QCL) behavior for an interfering physical downlink shared channel (PDSCH); and
obtain downlink control information (DCI) from a physical downlink control channel (PDCCH) or an enhanced physical downlink control channel (EPDCCH);
select, based on the DCI, a parameter set from the plurality of parameter sets; and
decode signals received from a serving cell based on the selected parameter set,
wherein the individual parameter sets include: a number of common reference signal (CRS) antenna ports for interfering PDSCH RE mapping; a CRS frequency shift for interfering PDSCH RE mapping; a multicast-broadcast single-frequency network (MBSFN) subframe configuration for interfering PDSCH RE mapping; a zero-power channel state information-reference signal (CSI-RS) resource configuration for interfering PDSCH RE mapping; a PDSCH starting position for interfering PDSCH RE mapping; and/or a CSI-RS resource configuration identity for quasi co-location with antenna ports of interfering PDSCH.

13. The one or more non-transitory computer-readable media of claim 12, wherein the DCI includes two bits and the plurality of parameter sets includes four parameter sets with individual parameter sets including RE mapping and QCL behavior for both serving and interfering PDSCH.

14. The one or more non-transitory computer-readable media of claim 12, wherein the individual parameter sets further include a number of CRS antenna ports for serving PDSCH RE mapping; a CRS frequency shift for serving PDSCH RE mapping; an MBSFN subframe configuration for serving PDSCH RE mapping; a zero-power CSI-RS resource configuration for serving PDSCH RE mapping; a PDSCH starting position for serving PDSCH RE mapping; and/or a CSI-RS resource configuration identity for quasi co-location.

15. The one or more non-transitory computer-readable media of claim 12, wherein the instructions, when executed by the one or more processors, further cause the user equipment to:
configure, with a QCL behavior type based on configuration information, the QCL behavior type to indicate that antenna ports 15-22 corresponding to a channel state information-reference signal (CSI-RS) resource configuration identified by a CSI-RS resource configuration identity for interfering PDSCH RE mapping of a selected parameter set is quasi co-located with antenna ports 7-14 associated with the interfering PDSCH with respect to Doppler shift, Doppler spread, average delay, and/or delay spread.

16. One or more non-transitory computer-readable media having instructions that, when executed by one or more processors, cause a user equipment to:

store a plurality of parameter sets, with individual parameter sets including parameters that correspond to resource element (RE) mapping or quasi co-location (QCL) behavior for an interfering physical downlink shared channel (PDSCH);

obtain downlink control information (DCI) from a physical downlink control channel (PDCCH) or an enhanced physical downlink control channel (EPDCCH);

select, based on the DCI, a parameter set from the plurality of parameter sets; and decode signals received from a serving cell based on the selected parameter set, wherein the plurality of parameter sets is a first plurality of parameter sets, the parameter set is a first parameter set, and the instructions, when executed by one or more processors, further cause the UE to:

store a second plurality of parameter sets, with individual parameter sets of the second plurality including parameters that correspond to RE mapping or QCL behavior for a serving PDSCH;

select, based on the DCI, a second parameter set from the second plurality of parameter sets; and decode signals received from the serving cell based further on the selected second parameter set.

* * * * *